(No Model.)
C. HEAP.
NAPPING MACHINE.
No. 584,113. Patented June 8, 1897.
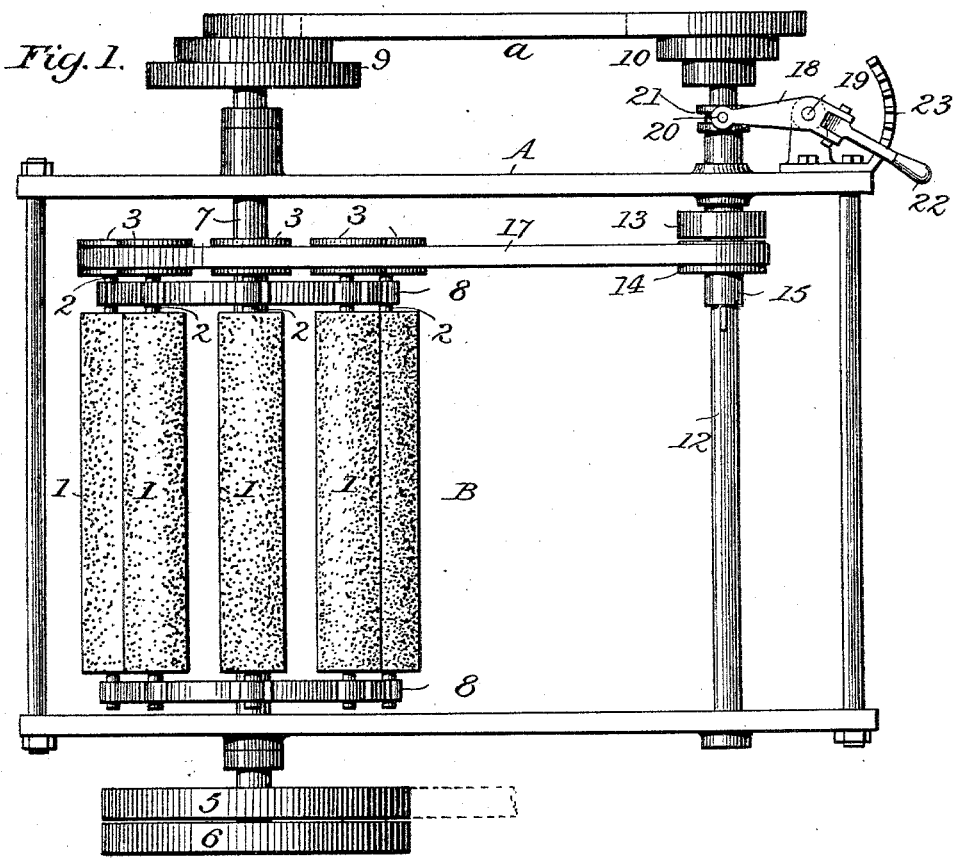
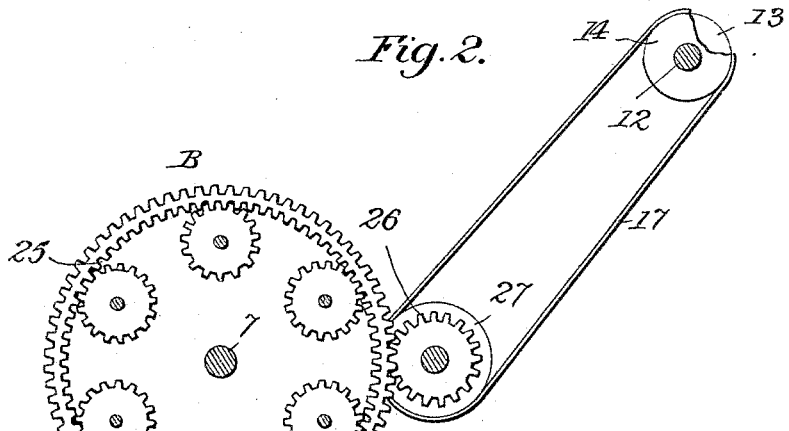
Witnesses
A. N. Dobson
I. A. Fairgrieve
Inventor
Charles Heap
by Foster Freeman
Attorneys

UNITED STATES PATENT OFFICE.

CHARLES HEAP, OF ROCHDALE, ENGLAND.

NAPPING-MACHINE.

SPECIFICATION forming part of Letters Patent No. 584,113, dated June 8, 1897.

Application filed January 29, 1895. Serial No. 536,556. (No model.)

*To all whom it may concern:*

Be it known that I, CHARLES HEAP, a subject of the Queen of Great Britain, residing at Rochdale, England, have invented certain new and useful Improvements in Napping-Machines, of which the following is a specification.

My invention relates to that class of napping-machines in which there is a revolving head carrying revolving napping-rollers; and my invention consists of means for varying the action and energy of such rollers, as fully set forth hereinafter, and as illustrated in the accompanying drawings, in which—

Figure 1 is a plan view of sufficient of a napping-machine to illustrate my improvements. Fig. 2 is an elevation of parts of the machine, illustrating a modification of the roller-driving gear.

The frame A is suitably constructed to support the operating parts with bearings for the shaft 7 of a drum B, consisting of heads 8 8, in which turn the axles 2 of the napping-rolls 1, the latter provided with teeth arranged in any usual or suitable manner, and at the ends of the axles 2 or at both ends, if desired, are pulleys 3, which may be plain pulleys or pinions, as hereinafter set forth.

The drum-shaft 7 has at one end a fixed pulley 5 and loose pulley 6 to receive the driving-belt by which the machine is driven, and at the opposite end of the shaft 7 is a cone-pulley 9, from which a belt passes to another cone-pulley 10 on a counter-shaft 12.

On the counter-shaft 12 are two pulleys 13 14, the former loose and the latter fixed, and the pulleys 3 are driven from the shaft 12 through either belt or toothed gearing. Thus, as shown in Fig. 1, a belt 17 passes from the pulley 14 on the counter-shaft 12 around the pulleys 3, and when the machine is in operation and the napping-rolls 1 are carried around with the head 8 the energy of the rolls varies to the extent to which their movements are accelerated or retarded by the movements of the counter-shaft through the intermediate connections, with results too well known to those skilled in the art to need description here. As is also well known, it is desirable to vary the speed at which the napping-rolls are moved from the counter-shaft, and in order to permit any desired extent of variation I provide for shifting the fixed and idle pulleys 13 14 so as to bring the belt 17 wholly or partially under the control of the fixed pulley, as desired.

When the belt is upon the loose pulley, it exerts practically no effect upon the pulleys 3, and the napping-rollers offer the minimum resistance and have little, if any, raising action upon the cloth. In proportion, however, as the belt is shifted onto the fixed pulley 14 it begins to exert a positive action upon the pulleys 3, which is increased in proportion as the belt is thrown farther onto the fixed pulley until the maximum resistance and strongest raising actions of the napping-rolls are obtained.

Different means may be employed for shifting the pulleys 13 14. I have shown them as arranged upon a sleeve 15, turning with but sliding upon the shaft 12, the pulley 14 being fixed to the sleeve and the pulley 13 turning loosely thereon. The sleeve is shifted by any suitable appliances—as, for instance, by means of an arm 18 upon a rock-shaft 19, carrying a pin 20, that enters a groove 21 between flanges of the sleeve. The rock-shaft 19 turns in bearings on the frame, and a handle 22 is shown as pivoted to a projection of the shaft and capable of being placed in notches of a retaining-bar 23, whereby the shaft may be rocked to any desired position and held in place after adjustment.

When toothed pulleys or pinions are used instead of plain pulleys 3, the driving means will be a toothed ring 25, having inner teeth engaging those of the pinions and outer teeth engaging a pinion 26 on a shaft carrying a pinion 27, through which passes a belt 17 from the pulleys upon the shaft 12, as illustrated in Fig. 2.

If a reverse action of the napping-rolls is required, a cross-belt may be substituted for the open belt *a* upon the cone-pulleys 9 10, which latter also afford means for varying the speed of the shaft 12, and by thus varying the speed of the said shaft 12 and also varying the position of the fixed and loose pulleys and the belt 17 I am able to secure very many degrees of energy of the napping-rolls.

Without limiting myself to the precise construction and arrangement of parts shown, I claim as my invention—

1. The combination with the revolving head and napping-rolls of a napping-machine, of a counter-shaft, means for positively driving the same at different speeds, fast and loose pulleys on the counter-shaft, a belt, pulleys on the ends of the napping-rolls driven from said belt, and means for adjusting the fast and loose pulleys in respect to the belt, substantially as described.

2. The combination with the revolving head and napping-rolls of a napping-machine, of a counter-shaft, fast and loose pulleys on the counter-shaft, a belt, pulleys on the ends of the napping-rolls driven from said belt, and means for adjusting the fast and loose pulleys in respect to the belt, substantially as and for the purpose set forth.

In testimony whereof I have signed my name to this specification in the presence of two subscribing witnesses.

CHARLES HEAP.

Witnesses:
JOHN M. BUCKLEY,
J. W. GRIMSHAW.